(12) United States Patent
Witenstein-Weaver

(10) Patent No.: US 9,596,515 B2
(45) Date of Patent: Mar. 14, 2017

(54) SYSTEMS AND METHODS OF IMAGE SEARCHING

(75) Inventor: Jason Witenstein-Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 97 days.

(21) Appl. No.: 13/343,630

(22) Filed: Jan. 4, 2012

(65) Prior Publication Data

US 2013/0174195 A1     Jul. 4, 2013

(51) Int. Cl.
*H04N 5/445* (2011.01)
*H04N 21/4722* (2011.01)
*H04N 21/4728* (2011.01)
*H04N 21/482* (2011.01)
*H04N 21/658* (2011.01)
*H04N 21/81* (2011.01)
*H04N 21/858* (2011.01)

(52) U.S. Cl.
CPC ..... *H04N 21/4722* (2013.01); *H04N 21/4728* (2013.01); *H04N 21/4828* (2013.01); *H04N 21/6582* (2013.01); *H04N 21/812* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 5,929,849 A * | 7/1999 | Kikinis | 725/113 |
| 7,240,075 B1 | 7/2007 | Nemirofsky et al. | |
| 7,813,557 B1 | 10/2010 | Bourdev | |
| 8,079,055 B2 * | 12/2011 | Hardacker et al. | 725/113 |
| 2007/0136773 A1 * | 6/2007 | O'Neil et al. | 725/100 |
| 2008/0229363 A1 * | 9/2008 | Lanfermann et al. | 725/47 |
| 2008/0320546 A1 | 12/2008 | Moon et al. | |
| 2009/0024617 A1 | 1/2009 | Cope | |
| 2009/0034805 A1 * | 2/2009 | Perlmutter et al. | 382/118 |
| 2009/0262213 A1 * | 10/2009 | Watanabe | G06K 9/00295 348/222.1 |
| 2009/0276805 A1 | 11/2009 | Andrews et al. | |
| 2009/0313084 A1 | 12/2009 | Chugh | |
| 2010/0037264 A1 * | 2/2010 | Hardacker et al. | 725/51 |
| 2011/0067051 A1 | 3/2011 | Karaoguz et al. | |
| 2011/0129153 A1 | 6/2011 | Petrou et al. | |
| 2011/0131605 A1 * | 6/2011 | Pratt et al. | 725/39 |
| 2011/0178871 A1 | 7/2011 | Watfa et al. | |
| 2011/0321082 A1 | 12/2011 | Weerasinghe | |

(Continued)

FOREIGN PATENT DOCUMENTS

| KR | 10090101748 | 9/2009 |
|---|---|---|
| KR | 20100137252 | 12/2010 |

OTHER PUBLICATIONS

International Search Report and Written Opinion for PCT/US2012/060453, date of mailing Mar. 28, 2013, 12 page.

(Continued)

*Primary Examiner* — John Schnurr
*Assistant Examiner* — Michael Telan
(74) *Attorney, Agent, or Firm* — Byrne Poh LLP

(57) ABSTRACT

Systems and methods of image searching include receiving content, receiving a request to select an image from content, selecting a plurality of items in the image, retrieving information about the selected item, and providing display data based on the retrieved information.

15 Claims, 7 Drawing Sheets

(56) References Cited

U.S. PATENT DOCUMENTS

2013/0054613 A1* 2/2013 Bishop .......................... 707/748

OTHER PUBLICATIONS

International Preliminary Report on Patentability dated Jul. 17, 2014 in International Patent Application No. PCT/US2012/060453.
Office Action dated Dec. 2, 2016 in CN Patent Application 201280071072.4.

* cited by examiner

SYSTEMS AND METHODS OF IMAGE SEARCHING

BACKGROUND

The present disclosure relates generally to searching an image, and more particularly, to searching an image to retrieve information.

SUMMARY

Implementations of the systems and methods of image searching are described herein. One implementation is a system including a processing circuit configured to receive video content from a media source. The system may further include the processing circuit configured to receive a request from a user to select an image from the video content. The system may also include the processing circuit configured to store the image in a memory. The system may include the processing circuit configured to select a plurality of items displayed in the image, wherein a first item has a known identity and a second item has an unknown identity. The system may also include the processing circuit configured to highlight the plurality of selected items in the image, wherein the highlighting of the first item has a different appearance than the highlighting of the second item. The system may yet further include the processing circuit configured to receive a user selection of one of the first and second items. The system may include the processing circuit configured to retrieve information about the selected item. The system may also include the processing circuit configured to provide display data based on the retrieved information.

Another implementation is a method including receiving, at a processor, video content from a media source. The method may also include receiving, at a processor, a request from a user to select an image from the video content. The method may further include storing the image in a memory. The method may include selecting a plurality of items in the image, wherein a first item has a known identity and a second item has an unknown identity. The method may also include highlighting the plurality of selected items in the image, wherein the highlighting of the first item has a different appearance than the highlighting of the second item. The method may further include receiving, at a processor, a user selection of one of the first and second items. The method may yet further include retrieving information about the selected item. The method may include providing display data based on the retrieved information.

Another implementation is a method for advertising using an advertisement server computer. The method may include receiving a selected image based on video content from a media source. The method may also include labeling the selected image including a plurality of items with advertising labels including content generated by an advertiser, the content generated by an advertiser including one of text, video or hyperlink. The method may further include providing an advertisement associated with an advertiser.

These implementations are mentioned not to limit or define the scope of the disclosure, but to provide an example of an implementation of the disclosure to aid in understanding thereof. Particular implementations can be developed to realize one or more of the following advantages.

The details of one or more implementations of the disclosure are set forth in the accompanying drawings and the description below. Other features, aspects, and advantages of the disclosure will become apparent from the description, the drawings, and the claims.

DETAILED DESCRIPTION

A media source may provide, through a server, video content to various applications, such as a web browser, applications running within a web browser, internet-enabled televisions, etc. The video content may include images that may be provided to an image-matching system such as a server, client-based API, etc. For example, a format for image file(s) may be written by an image server, which may include an image-matching module, to cause the images served by the image server to be referenced when the system retrieves the image file(s). For example, an image server may be configured to ask a web server information using an image query, so that when an object is selected by a user, information associated with the image may be displayed.

The terms "a first item" and "a second item" are used for clarity and simplification within the disclosure. The number of items within an image may include more than a first and a second item. Each of the items may have a known identity, unknown identity, potentially known identity, etc.

Figure 1:
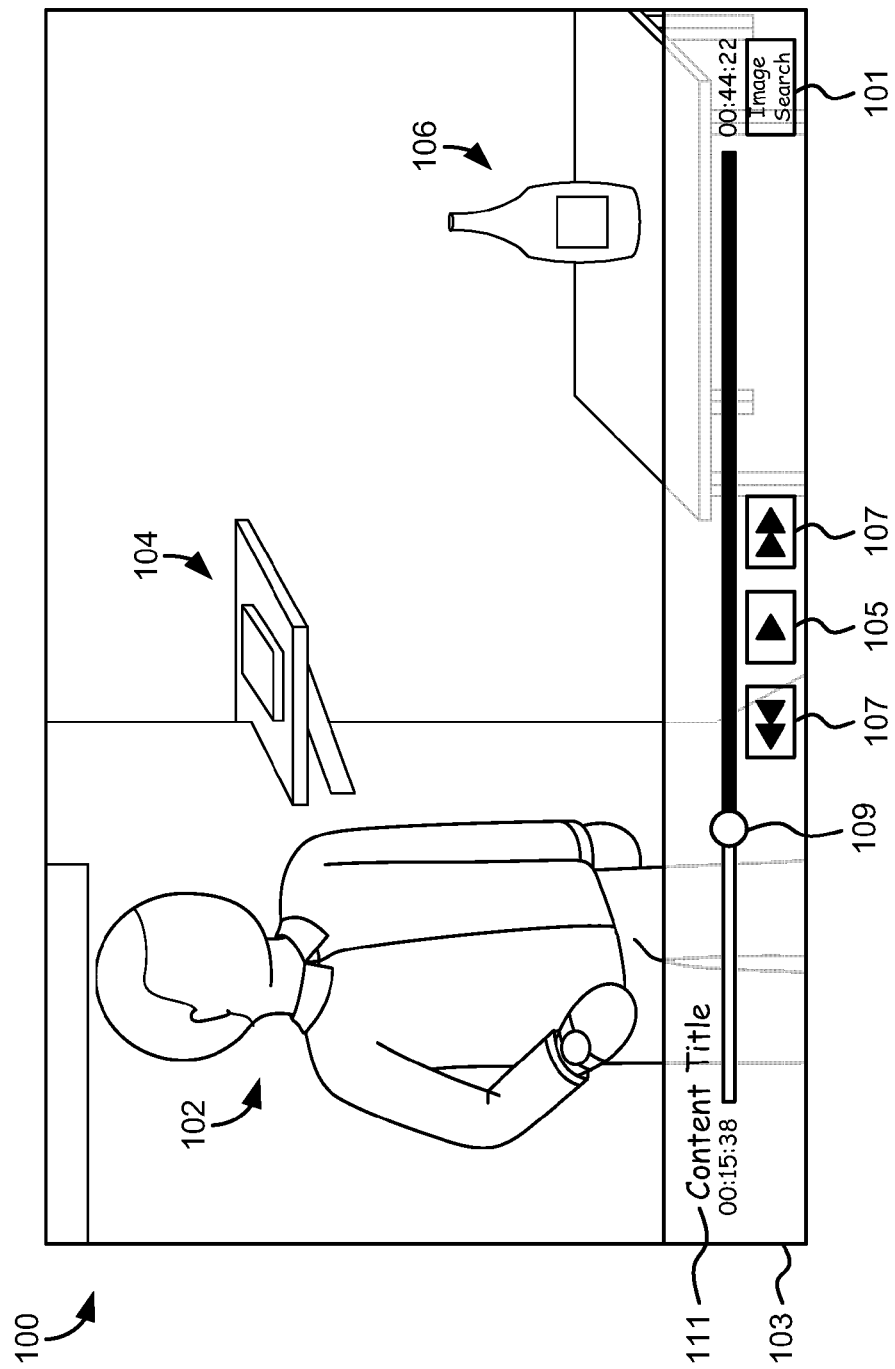
FIG. 1 illustrates a selected image in accordance with a described implementation.

FIG. 1 illustrates a selected image 100 in accordance with a described implementation. In FIG. 1, video content is received from a media source and displayed on a display device. In some implementations, the video content may be provided by an application operating on a computing device. In some implementations, the device may include DVR, DVD, Google TV, (e.g., a set-top box, an integrated internet television device, etc.), etc. The video content may include streaming content, webpage/website content, etc. The video content may include a plurality of images. The computing device may be configured to receive from the user a notification that the user would like to select an image from the video content. In some implementations, the notification may be a request to pause, stop, or select a portion of the video content. The computing device may be configured to display a user input device 101, for example, an "image search" input device, configured to receive the user selection of an image within the video content. User input device 101 may appear in a control panel portion 103 of a display. The control panel portion 103 may include a play button 105, fast forward/reverse buttons 107, a slider bar 109 showing the progress of playing video content, a content title 111, etc. In this embodiment, control panel portion 103 is shown as an overlay of the video content, by having a portion of video content showing through the control panel portion. In FIG. 1, the image 100 shows representations of a human 102, a book on a ledge 104, and a bottle on a table 106.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Figure 2:
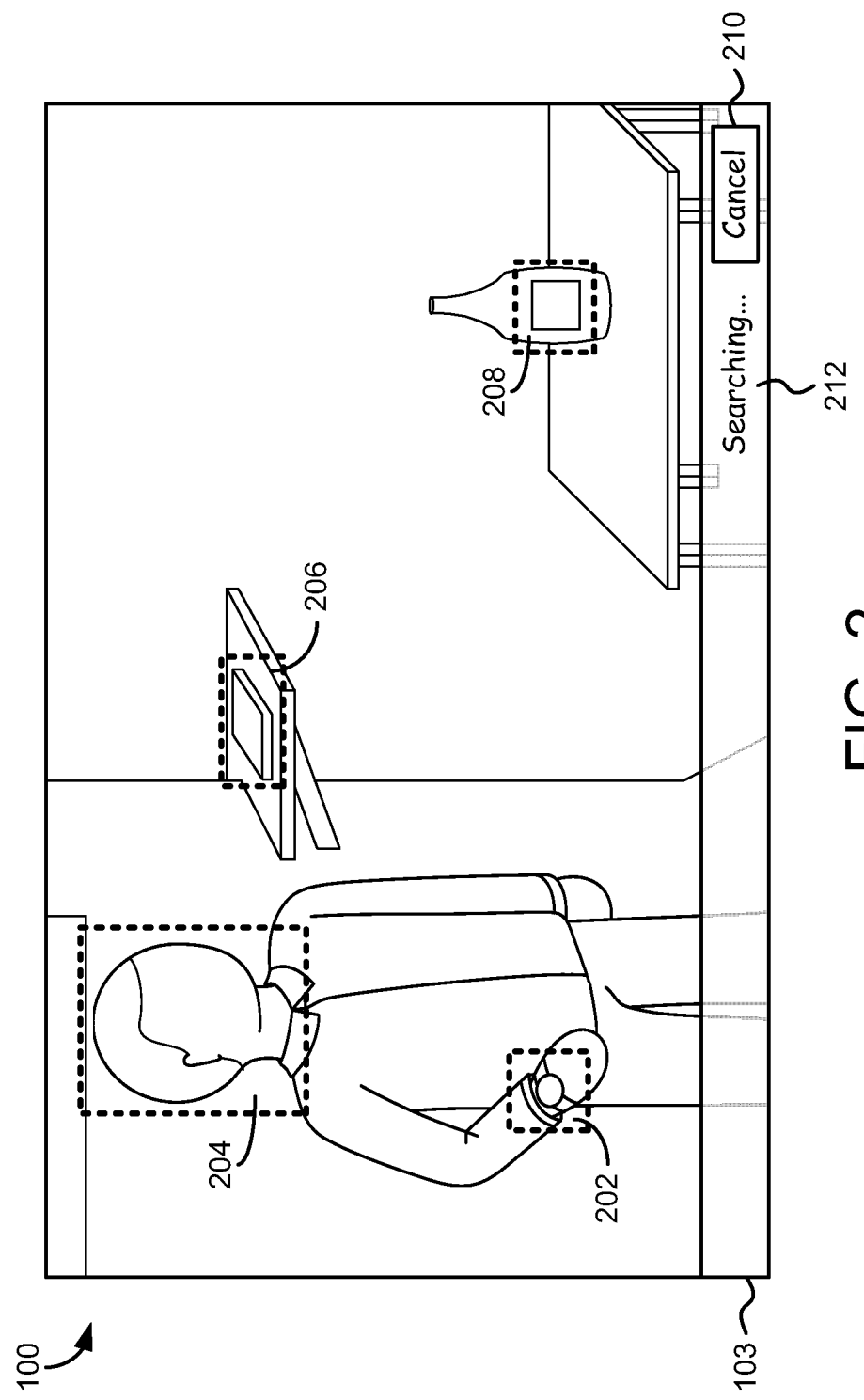
FIG. 2 illustrates a selected plurality of items displayed in the image, in accordance with a described implementation.

FIG. 2 illustrates a selected plurality of items displayed in the image 100, in accordance with a described implementation. The system receives a request from the user to select an image 100 from the video content. The image 100 may be stored in a memory. In some implementations, the image 100 includes an advertisement associated with an advertiser. The advertisement may include a hyperlink to a webpage associated with the advertiser. In some implementations, a plurality of items are displayed in the image 100. The plurality of items 100 may include, but are not limited to, a human face, an object, etc. In some implementations, the plurality of items may be selected by the system or tagged within the video content by the producer of the video content. In some implementations, the plurality of items may be selected by the user, for example, by dragging a geographic shape (e.g., square, oval, etc.) over a portion of the image. The system may notify the user that a search of the plurality of items has begun. For example, in FIG. 2, a plurality of items (e.g., human 202, watch 204, book 206, bottle 208) are delineated with dashed lines to signify the selection of the items by the system and/or the user.

The system may or may not know the identity of the plurality of items 202, 204, 206, 208, which may be stored in a memory as a status for each item. The system may provide a notification to the user via the display of the status of the identity. For example, in FIG. 2, the plurality of items may be highlighted with various colors. It is noted that many different methods may be used to provide a notification of the status of the identity of the items, e.g., auditory, graphical, visual, and/or tactile notifications, may be provided. The system may search the highlighted areas for further information regarding the items 202, 204, 206, 208. The system may perform a character recognition algorithm to determine textual characters associated with an item. For example, the bottle 208 may include text that the system may use to further identify the item and/or retrieve information about the selected item. In some implementations, the system may identify a text region of the received image by dividing the image into a plurality of regions, detecting features in each region of the plurality of regions, analyzing detected features in each region, and determining whether the detected features include text. The system may be configured to receive a user request to cancel 210 the search at any time; in response to this request, the system may be configured to resume the video content. The control panel may provide an indication 212 that the system is currently searching in an attempt to identify the plurality of items.

Figure 3:
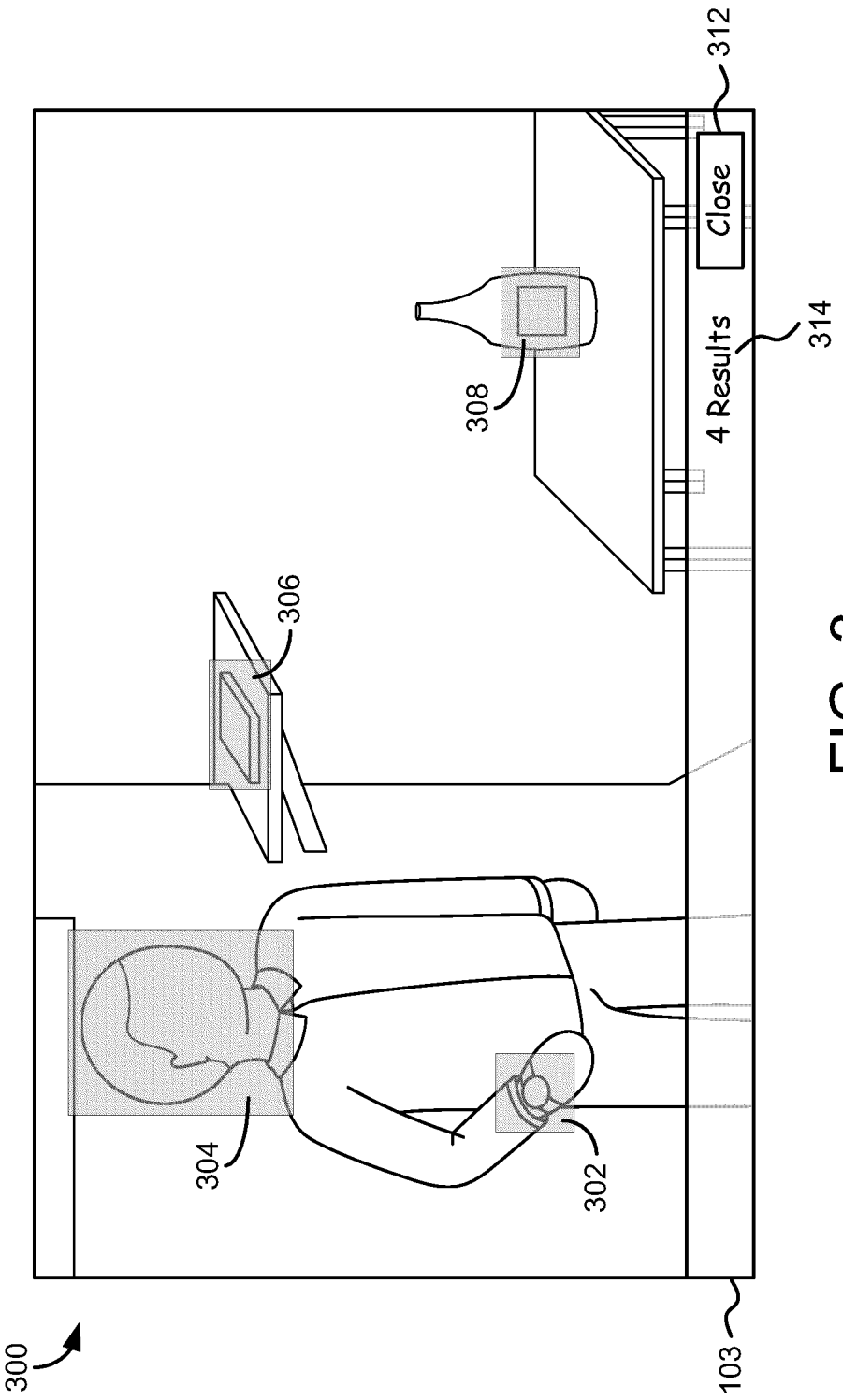
FIG. 3 illustrates highlighted images in accordance with a described implementation.

FIG. 3 illustrates highlighted images in accordance with a described implementation. The plurality of selected items in the image 100 are highlighted. The highlighting of the first item may have a different appearance than the second item. In FIG. 3, the highlighted areas 302, 304, 306, 308 may be color coded (in the image illustrated in FIG. 3, the highlighted areas 302, 304, 306, 308 are shown as shaded and not differentiable, but it should be understood that the highlighted areas may be of various colors). The system may provide a notification that the retrieval of information about the selected item is complete. For example, in FIG. 3, the dashed lines surrounding the plurality of items are replaced by solid lines to indicate completion of the search, or to indicate whether the search successfully identified the object. The system may also provide a notification regarding the status of the search for identities of the items. For example, in FIG. 3, green may signify that the item has a known identity, yellow may signify that the item has a plurality of known or potential identities, and red may signify that the item does not have a known identity. There are many methods that may be used to provide a notification regarding the status of the identities of the items. In some implementations, auditory feedback may be provided, e.g., a voice-activated notification. For example, "the bottle's identity is known, the watch has multiple identities, and the book does not have a known identity."

The system may search for the identities of the plurality of search items by sending image data to an image matching module. The image data may represent only a portion of the image that has been selected for potential identification. The system may receive a report from the image matching module based on the search. If an identity is found for an item based on the report, then the item is a first item having a known identity. If an identity is not found for an item based on the report, then the item is a second item having an unknown identity. In some implementations, the report may indicate a potentially known identity, in which case the system may display the item with a highlighting having a different appearance than the first and second item appearances. For example, the item may be recognized by the system as possibly having a match, but the system may require more information. In this case, the system may query additional sources, such as a web-based server or the user, for more information. In one example, a plurality of potential identities may be displayed to the user for user selection of the particular identity. The potential identities may be textual descriptions, image matches, a combination of textual descriptions and image matches, or other potential identifying information (e.g., a web link to a web page relating to the item, etc.).

The system may also display the number of results 314, i.e., the number of items, the number of matches, etc. The user may exit the search and resume the video content by selecting a close button 312.

Figure 4:
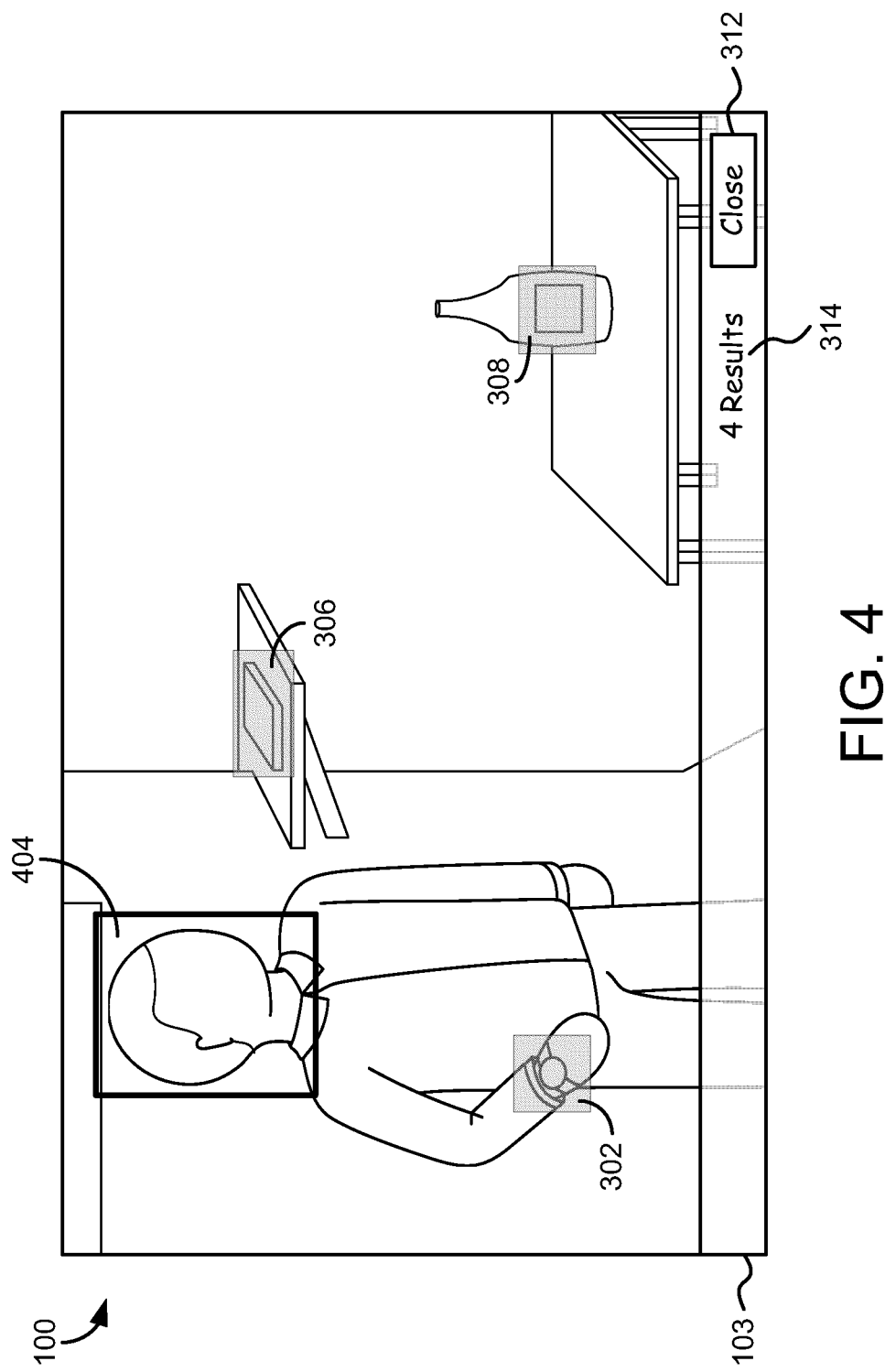
FIG. 4 illustrates a selected highlighted image of a human face in accordance with a described implementation.

FIG. 4 illustrates a selected highlighted image 404 of a human face in accordance with a described implementation. The system may receive a user selection of one of the item(s). The user may select the item(s) by using a d-pad, joystick, mouse, or other appropriate peripherals, to navigate through the selected highlighted images to make a selection of an item or image portion for which the user wishes to find and display additional information. A d-pad may include a directional input device including different buttons representing different directions. The d-pad may be part of a handheld remote controller, which may further including an alphabetical keyboard, touchpad for moving a mouse, hot keys, such as a "search" hotkey, and/or other user input buttons or devices (e.g., a microphone for voice commands). For example, in FIG. 4, the user selects a human face 404. The system retrieves information about the selected item 404, the human face in FIG. 4.

Figure 5:
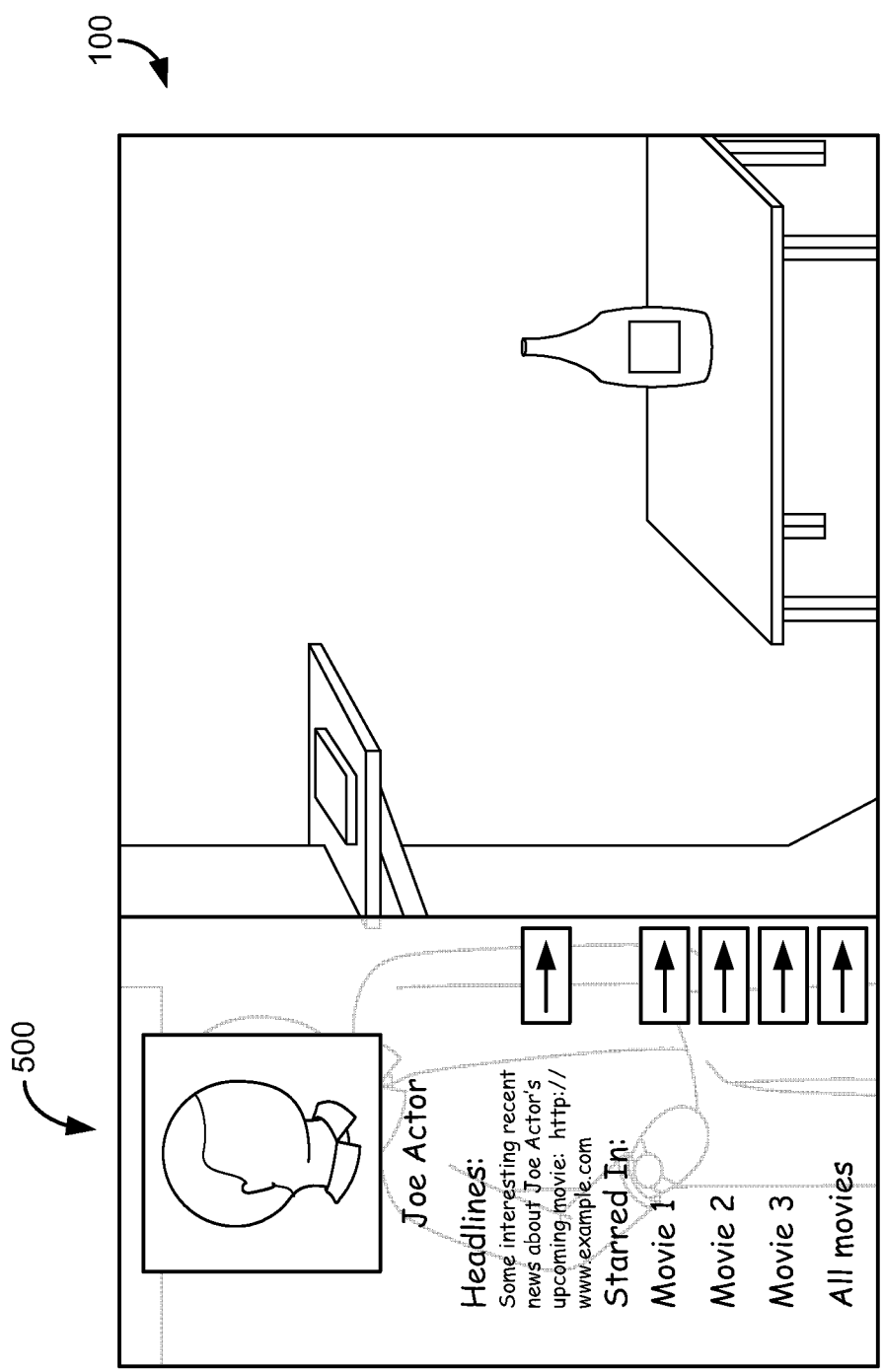
FIG. 5 illustrates display data based on retrieved information about the selected item in accordance with a described implementation.

FIG. 5 illustrates display data based on retrieved information about the selected item in accordance with a described implementation. In FIG. 5, the display data includes data provided as an overlay 500 to the video content. The overlay 500 may be presented in any of a number of positions on the display. An overlay may include a display screen, a window (e.g., display, video, etc.), layer, etc. The overlay 500 may include option(s) to see all of the search results, proceed through the results, close the results, etc. The overlay 500 may include details about the selected item. For example, in FIG. 5, the overlay 500 includes the selected item, a human face, along with additional information such as name, news, and other relevant information. The system may also provide a hyperlink to additional information on the Internet. For example, a link to a book written by or about the person represented by the selected item may be provided to the user.

Figure 6:
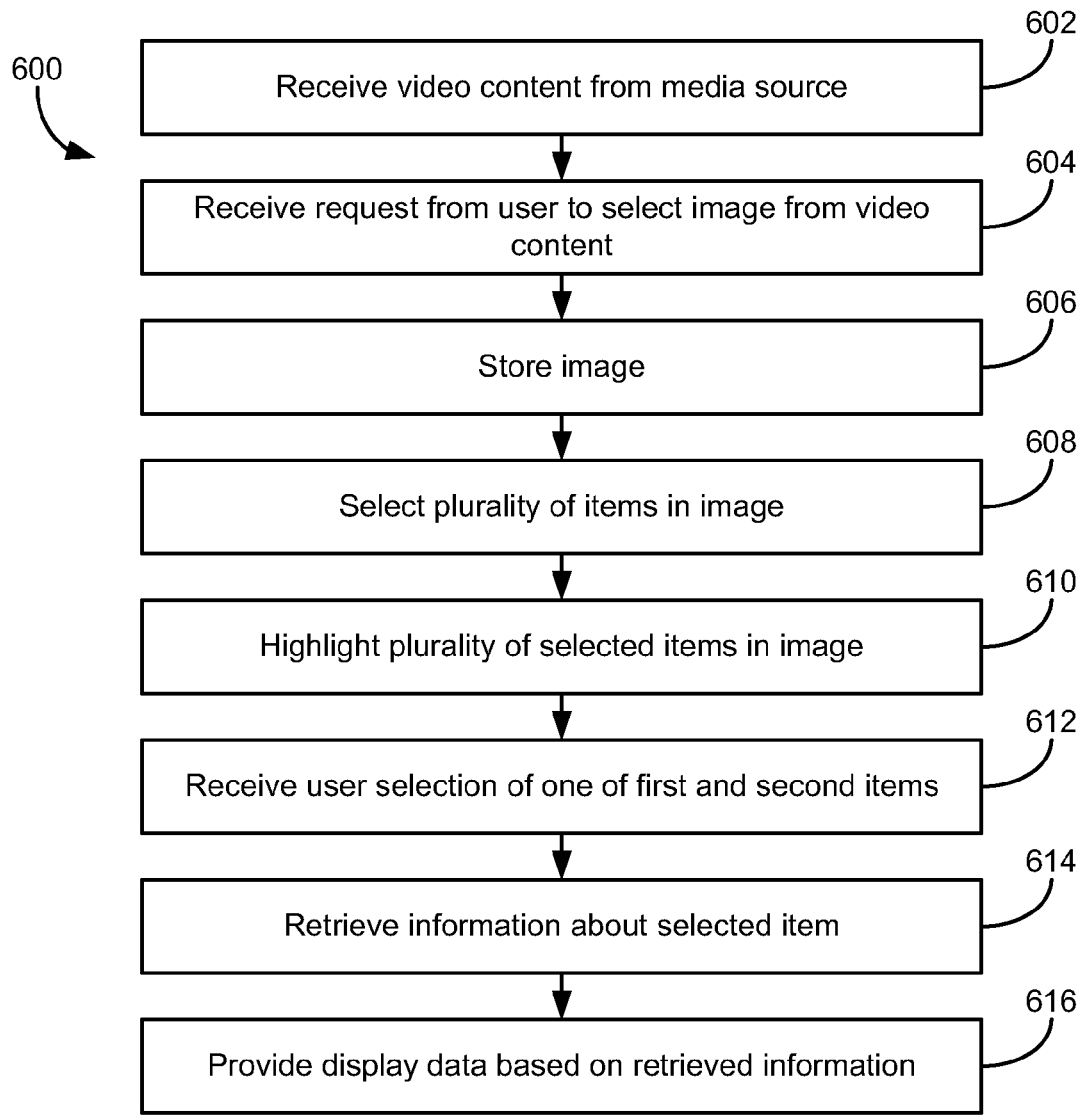
FIG. 6 is a flow diagram of a method for image-searching of video content in accordance with a described implementation.

FIG. 6 is a flow diagram of a method for image-searching of video content in accordance with a described implementation. Generally, a user selects an image from video content from a media source, the system selects a plurality of items within the image and retrieves an identity status of the item(s), then the user selects one of the item(s), and the system provides information about the selected item(s).

The method 600 is provided by way of example, as there are a number of ways to carry out the methods according to the present disclosure. The method 600 shown in FIG. 6 can be executed or otherwise performed by one or by a combination of various systems. The method may be implemented by a computer, a computer program, a client, a server, a client-server relationship, etc. The method 600 is described herein as carried out by the system 100 of FIGS. 1-5 and/or the computing devices of FIG. 8, by way of example.

The example method begins at block 602, in which a processor receives video content from a media source, which may be a server computer, a memory device (e.g., a digital versatile disc, a home media storage device, etc.), or another source. At block 604, a processor receives a request from a user to select an image from the video content. Block 604 is followed by block 606, in which the image is stored in a memory, for example, a local memory on a smart television module or tablet PC, or a memory device on a remote server computer. Block 606 is followed by block 608, in which a plurality of items in the image are selected, wherein a first item has a known identity and a second item has an unknown identity. In some implementations, the image includes an advertisement associated with an advertiser. The advertisement may include a hyperlink to a webpage associated with the advertiser. In some implementations, a plurality of items are displayed in the image. The plurality of items may include, but are not limited to, a human face, an object, a skyline, etc. In some implementations, the plurality of items may be selected by the system. In some implementations, the plurality of items may be selected by the user. The system may notify the user that a search of the plurality of items has begun. For example, in FIG. 2, the plurality of items are delineated with dashed lines to signify the selection of the items.

The plurality of items may have a known or unknown identity. The system may provide a notification on the status of the identity. It is noted that many different methods may be used to provide a notification of the status of the identity of the items, e.g., auditory, graphical, visual, tactile notifications may be provided. The system may search the highlighted areas for further information regarding the items. The system may perform a character recognition algorithm to determine textual characters associated with an item. For example, the bottle may include text that the system may use to further identify the item and/or retrieve information about the selected item. In some implementations, the system may identify a text region of the received image by dividing the image into a plurality of regions, detecting features in each region of the plurality of regions, analyzing detected features in each region, and determining whether the detected features include text. The system may determine that the video content has predetermined item identifier data within the video content received from the media source. For example, the video content may have embedded content that the system may recognize.

In some implementations, the system may perform a recognition algorithm on the image. The recognition algorithm may scan the image for the plurality of items with a known identity. The system may include a priority for searching the image for items, for example, focusing the search on items such as faces, logos, emblems, words, objects, etc. In other implementations, a video content producer may adjust the system to embed content within the image (e.g., advertisements, products, etc.), which may adjust the priority for searching the image for items. In some implementations, the user may adjust the priority for searching the image for items, e.g., to focus the search on item(s) and/or exclude the search for other item(s).

In some implementations, some of the items may have an unknown identity. An unknown identity may include a scenario where the item(s) are recognized by the system, but is not a selected item(s). The system may include a database for item(s) (e.g., trees, sky, grass, roads, water, patterns, etc.) that are recognized by the system, but are not selected item(s). In some implementations, an unknown identity may include item(s) that are not in focus on the image.

Block 608 is followed by block 610, in which the plurality of selected items in the image are highlighted, wherein the highlighting of the first item has a different appearance than the highlighting of the second item. The system may provide a notification that the retrieval of information about the selected item is complete. The system may also provide a notification regarding the status of the search for identities of the items. There are many methods that may be used to provide a notification regarding the status of the identities of the items. In some implementations, auditory feedback may be provided, e.g., a voice-activated notification. For example, "the bottle's identity is known, the watch has multiple identities, and the book does not have a known identity."

The system may search for the identities of the plurality of search items by sending image data to an image matching module. The system may receive a report from the image matching module based on the search. If an identity is found for an item based on the report, then the item is a first item having a known identity. If an identity is not found for an item based on the report, then the item is a second item having an unknown identity. In some implementations, the report may indicate a potentially known identity and highlighting the item with a highlighting having a different appearance than the first and second item appearances. For example, the item may be recognized by the system as possibly having a match, but the system requires more information. In this case, the system may query additional sources, such as a web-based server or the user, for more information.

Block 610 is followed by block 612, in which a processor receives a user selection of one of the first and second items. Block 612 is followed by block 614, in which information about the selected item is retrieved. Block 614 is followed by block 616, in which display data based on the retrieved information is provided. The display may be a user interface, such as a graphical user interface, command line interface, web-based user interface, touchscreen, etc. The display data may include data provided as an overlay to the video content.

Figure 7:
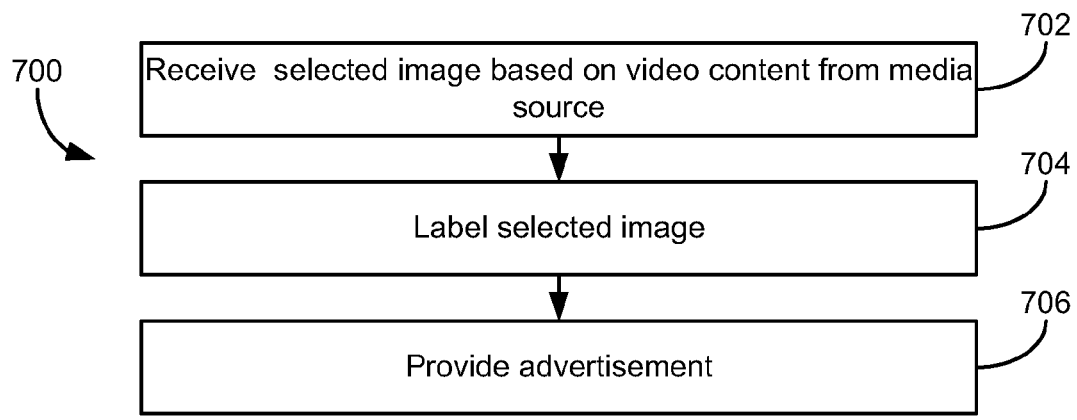
FIG. 7 is a flow diagram of a method for advertising in accordance with a described implementation.

FIG. 7 is a flow diagram of a method for advertising in accordance with a described implementation. Generally, an image is selected based on video content from a media source, the plurality of items within the selected image are labeled by an advertisement server computer, and an advertisement associated with an advertiser is provided.

The method 700 is provided by way of example, as there are a number of ways to carry out the methods according to the present disclosure. The method 700 shown in FIG. 7 can be executed or otherwise performed by one or by a combination of various systems. The method may be implemented by a computer, a computer program, a client, a server, a client-server relationship, etc. The method 700 is described herein as carried out by the systems of FIGS. 1-5 and/or the computing devices of FIG. 8, by way of example.

The example method begins at block 702, in which an advertisement server computer receives a selected image based on video content from a media source. In some implementations, the image may be selected by the system. In some implementations, the user selects an image. Block 702 is followed by block 704, in which the advertisement server computer labels the selected image, for example in response to programming data provided by a user. Block 704 is followed by block 706, in which the advertisement server computer provides an advertisement associated with an advertiser and/or product or service to be advertised. The selected image may include a plurality of items with advertising labels. The advertising labels may include content generated by an advertiser. The content generated by an advertiser may include text, video, and hyperlink(s). The hyperlink may include a website associated with the advertiser. In some implementations, the content is interactive with the user. In some implementations, the advertising labels may be generated by users of an online community. The user-generated content may include user profile data, user comments, user preferences, and other appropriate user-generated content. For example, user A may select an image in video content from a media source. The selected image may include a plurality of items, for example, a watch. The watch may be identified with a known identity. User A may select the watch. The display data based on retrieved information about the selected item may include a link to ABC Watch Co. It may also include a comment, like, etc., from user B from a related online community. In some implementations, the user review may be from an unrelated online community. For example, @prettyinpink1234 "ABC Watches are divine."

Figure 8:
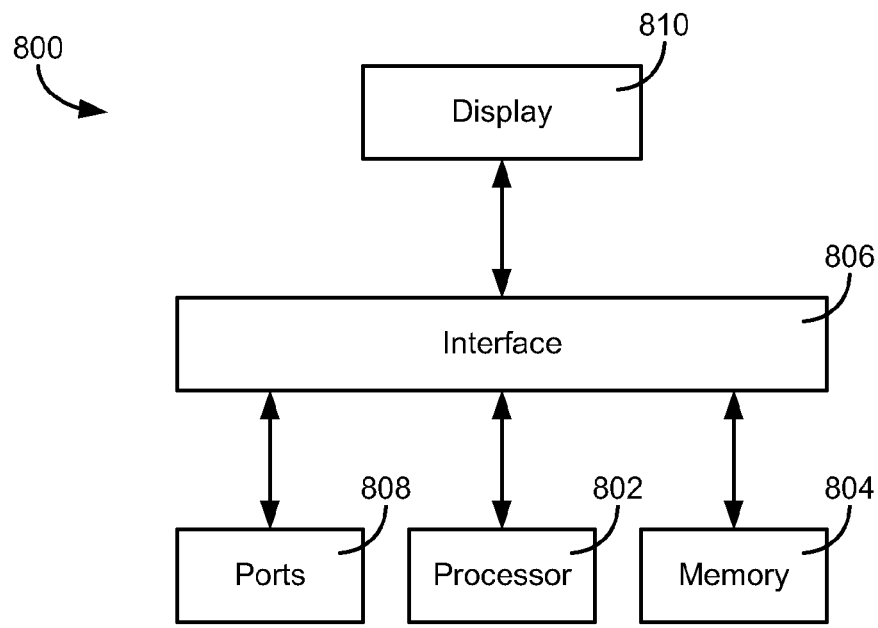
FIG. 8 is a block diagram of devices that may be used to implement the systems and methods in accordance with the described implementations.

FIG. 8 is a block diagram of a computing device 800 that may be used to implement the systems and methods in accordance with the described implementations, as either a client or as a server or plurality of servers. Computing device 800 may include, but is not limited to, digital computers, such as laptops, desktops, workstations, personal digital assistants, servers, blade servers, mainframes, cellular telephones, smartphones, mobile computing devices (e.g., a notepad, e-reader, etc.) etc.

Computing device 800 includes a processor 802, memory 804, an interface 806 and ports 808. Each of the components 802, 804, 806, and 808, are interconnected using various busses, and may be mounted on a common motherboard or in other manners as appropriate. The processor 802 can process instructions for execution within the computing device 800, including instructions stored in the memory 804 to display graphical information for a GUI on an external input/output device, such as display 810 coupled to interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, a multi-processor system, etc.). The ports 808, which may include various communication ports (e.g., USB, Bluetooth, Ethernet, wireless Ethernet, etc.), may be coupled to one or more input/output devices, such as a keyboard, a mouse, a pointing device, a scanner, etc., or a networking device (a switch, adapter, bridge, router, hub, repeater, etc.).

The processor 802 may provide, for example, for coordination of the other components of the device 800, such as control of user interfaces, applications run by device 800, and wireless communication by device 800. Processor 802 may communicate with a user via interface 806 (e.g., control, display, external, etc.), coupled to a display 810. The display 810 may be, for example, a TFT (Thin-Film-Transistor Liquid Crystal Display) display, an OLED (Organic Light Emitting Diode) display, other flexible display, etc. The interface 806 may include circuitry for driving the display 810 to provide graphical, textual, and other information to a user. The interface 806 may receive commands (e.g., voice-activated, text, etc.), from a user and convert them to provide to the processor 802. In addition, the interface 806 may be provided to communicate with processor 802 and enable near area communication of device 800 with other devices. The interface 806 may provide, for example, for wired communication. In some implementations, multiple interfaces may be used. Computing device 800 may communicate wirelessly through interface 806, which may include digital signal processing circuitry where necessary. Interface 806 may provide for communications under various modes or protocols, such as GSM voice calls, SMS, EMS, or MMS messaging, CDMA, TDMA, PDC, WCDMA, CDMA2000, or GPRS, etc. Such communication may occur, for example, through a radio-frequency transceiver. In addition, short-range communication may occur, such as using a Bluetooth, WiFi, or other such transceiver. In addition, GPS (Global Positioning System) receiver module may provide additional navigation- and location-related wireless data to device 800, which may be used as appropriate by applications running on device 800. The device 800 may also be provided with a storage device to provide additional storage, e.g., solid-state flash media. Each of the components may be interconnected using various buses. Several of the components may be mounted on a common motherboard or in other appropriate manners.

Device 800 may communicate audio feedback. In some implementations, an audio codec may receive spoken information from a user and convert it to usable digital information. The audio codec may generate audible sound for a user, such as through a speaker, e.g., in a handset of device. Sound(s) may include sound from voice telephone calls, recorded sound (e.g., voice messages, music files, etc.), sound(s) generated by applications operating on device, etc.

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. The memory 804 may be capable of providing mass storage for the computing device 800. In one implementation, the memory 804 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer or machine-readable medium, such as the memory 804, memory on processor 802, a propagated signal, etc. Expansion memory may be provided and connected to device 800 through interface 806.

These computer programs (e.g., programs, software, software applications or code), include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Controllers (PLCs) Programmable Logic Devices (PLDs)), used to provide machine instructions and/or data to a programmable processor.

To provide for interaction with a user, the systems and techniques described here can be implemented on a computer having a display device (e.g., a CRT (cathode ray tube) or LCD (liquid crystal display) monitor), for displaying information to the user and a keyboard and a pointing device (e.g., a mouse or a trackball), by which the user can provide input to the computer. Other kinds of devices can be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back-end component, a middleware component, or a front-end component, or any combination of back-end, middleware, or front-end components. The components of the system may be interconnected by any form or medium of digital data communication (e.g., a communication network). Examples of communication networks include a local area network ("LAN"), a wide area network ("WAN"), and the Internet.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A system comprising:
a processing circuit configured to:
receive video content from a media source;
receive a request from a user to select an image from the video content;
store the image in a memory;
determine that the image includes a plurality of items displayed in the image;
conduct a search for known items that each correspond to one of the plurality of items displayed in the image while providing a first visual indication for each of the plurality of items displayed in the image to signify a search status for that item, wherein the first visual indication is modified from a first visual state indicating that the search for the corresponding known item is ongoing to a second visual state indicating that the search for the corresponding known item is completed;

determine, based on the search, that the plurality of items displayed in the image includes a first item having a known identity and a second item having a plurality of known identities;

provide a second visual indication for each of the plurality of items within the selected image to signify an identification status for that item by highlighting the first item and the second item in the image, wherein the highlighting of the first item has a different color than the highlighting of the second item to signify that the first item has the known identity and the second item has the plurality of known identities;

receive a user selection of one of the first item or the second item;

retrieve information about the selected item; and provide display data, on a display device, in an overlay of the image of the video content, based on the retrieved information, wherein the display data comprises a hyperlink directing the user to their browser on the display device for more information about the selected item.

2. The system of claim 1, wherein the selection comprises performing a character recognition algorithm on the image to determine textual characters associated with the item displayed in the image.

3. The system of claim 1, wherein the selection comprises determining the video content has predetermined item identifier data within the video content received from the media source.

4. The system of claim 1, wherein the image comprises an advertisement associated with an advertiser, the advertisement comprising a hyperlink to a web page associated with the advertiser.

5. The system of claim 1, wherein the plurality of items displayed in the image comprise at least one of a human face, and object, and a scene.

6. The system of claim 1, wherein the processing circuit is further configured to identify a text region of the image by:
dividing the image into a plurality of regions;
detecting features in each region of the plurality of regions;
analyzing detected features in each region; and
determining whether the detected features comprises text.

7. The system of claim 1, wherein the processing circuit is further configured to:
search for identities of the plurality of selected items, wherein the search comprises sending image data to an image matching module;
receive a report from the image matching module based on the search;
if an identity is found for an item based on the report, determine that the item is a first item having a known identity;
if an identity is not found for an item based on the report, determine that the item is a second item having an unknown identity or that the second item has a plurality of known identities.

8. A method comprising:
receiving, at a processor, video content from a media source;
receiving, at a processor, a request from a user via a pause command to select an image from the video content;
storing the image in a memory;
determining that the image includes a plurality of items displayed in the image;
conducting a search for known items that each correspond to one of the plurality of items displayed in the image while providing a first visual indication for each of the plurality of items displayed in the image to signify a search status for that item, wherein the first visual indication is modified from a first visual state indicating that the search for the corresponding known item is ongoing to a second visual state indicating that the search for the corresponding known item is completed;
determining, based on the search, that the plurality of items displayed in the image includes a first item having a known identity and a second item having a plurality of known identities;
providing a second visual indication for each of the plurality of items within the selected image to signify an identification status for that item by highlighting the first item and the second item in the image, wherein the highlighting of the first item has a different color than the highlighting of the second item to signify that the first item has the known identity and the second item has the plurality of known identities;
receiving, at the processor, a user selection of the first or the second item;
retrieving information about the selected item; and
providing display data, on a display device, in an overlay of the image of the video content based on the retrieved information, wherein the display data comprises a hyperlink directing the user to their browser on the display device for more information about the selected item.

9. The method of claim 8, wherein the selection comprises performing a character recognition algorithm on the image to determine textual characters associated with the items displayed in the image.

10. The method of claim 8, wherein the selection comprises determining the video content has predetermined item identifier data within the video content received from the media source.

11. The method of claim 8, wherein the image comprises an advertisement associated with an advertiser, the advertisement comprising a hyperlink to a web site associated with the advertiser.

12. The method of claim 8, wherein the plurality of items displayed in the image comprise at least one of a human face, object, and a scene.

13. The method of claim 8, further comprising identifying a text region of the image by: dividing the image into a plurality of regions; detecting features in each region of the plurality of regions; analyzing detected features in each region; and determining whether the detected features comprise text.

14. The system of claim 1, wherein the information about the selected item comprises information about each of the plurality of known identities, and wherein the processing circuit is further configured to:
receive a second user selection of one of the plurality of known identities; and
retrieve additional information about the selected one of the plurality of known identities.

15. The method of claim 8, wherein the information about the selected item comprises information about at least one of the plurality of known identities, and the method further comprises:
 receiving a second user selection of one of the plurality of known identities; and
 retrieving additional information about the selected one of the plurality of known identities.

* * * * *